United States Patent
Green et al.

[11] Patent Number: 5,283,051
[45] Date of Patent: Feb. 1, 1994

[54] REACTOR VESSEL DISCHARGE

[75] Inventors: Alan Green; Martin K. Hopper; Ian H. Mercer, all of South Humberside, England

[73] Assignee: Conoco Inc., Ponca City

[21] Appl. No.: 917,056

[22] PCT Filed: Aug. 1, 1992

[86] PCT No.: PCT/GB91/00152
§ 371 Date: Oct. 1, 1992
§ 102(e) Date: Oct. 1, 1992

[87] PCT Pub. No.: WO91/11255
PCT Pub. Date: Aug. 8, 1991

[30] Foreign Application Priority Data
Feb. 1, 1990 [GB] United Kingdom ............... 9002257

[51] Int. Cl.⁵ ................................................. B01J 8/00
[52] U.S. Cl. ................................. 422/219; 55/364; 422/145; 422/232
[58] Field of Search ............... 422/145, 213, 219, 232, 422/243; 15/257.01; 220/373, 404, 371, 368, 745, 747, 484; 55/361, 364, 378, 379, 381, 429

[56] References Cited

U.S. PATENT DOCUMENTS

| | | | |
|---|---|---|---|
| 2,697,512 | 12/1954 | Brown | 55/364 X |
| 3,666,174 | 5/1972 | Bryika et al. | 126/110 B X |
| 3,895,916 | 7/1975 | Rösner | 71/9 |
| 4,244,717 | 1/1981 | Butcher | 55/364 |
| 4,326,864 | 4/1982 | Sittler | 55/364 |
| 4,339,412 | 7/1982 | Durand et al. | 422/117 |
| 4,817,644 | 4/1989 | Holmes et al. | 134/6 |
| 4,820,496 | 4/1989 | Sapoff | 422/219 |
| 4,946,478 | 8/1990 | Davis et al. | 55/364 X |

FOREIGN PATENT DOCUMENTS

| | | |
|---|---|---|
| 490235 | 8/1938 | United Kingdom . |
| 490279 | 8/1938 | United Kingdom . |
| 1515097 | 6/1978 | United Kingdom . |
| 2226878 | 7/1990 | United Kingdom . |

*Primary Examiner*—Robert J. Warden
*Assistant Examiner*—Amalia Santiago

[57] ABSTRACT

An apparatus and method are provided for containing particulate material e.g.: spent catalyst when evacuating an industrial reactor vessel used in hydrocarbon processing. A containment bag (3) is provided one end of which is located adjacent the wall of the reactor housing (1) about an outlet (2) thereof. The bag (3) has a panel defining side walls (4, 5), and a top wall (6) and an end panel (7) and assumes a generally cuboid shape when inflated in use. A barrier wall (22) may be constructed in the vicinity of the outlet (2) to provide additional containment. In one embodiment, a vent outlet G is defined in the region adjacent the vessel outlet to permit venting of steam and air whilst discharged particulate material is contained within the bag.

20 Claims, 3 Drawing Sheets

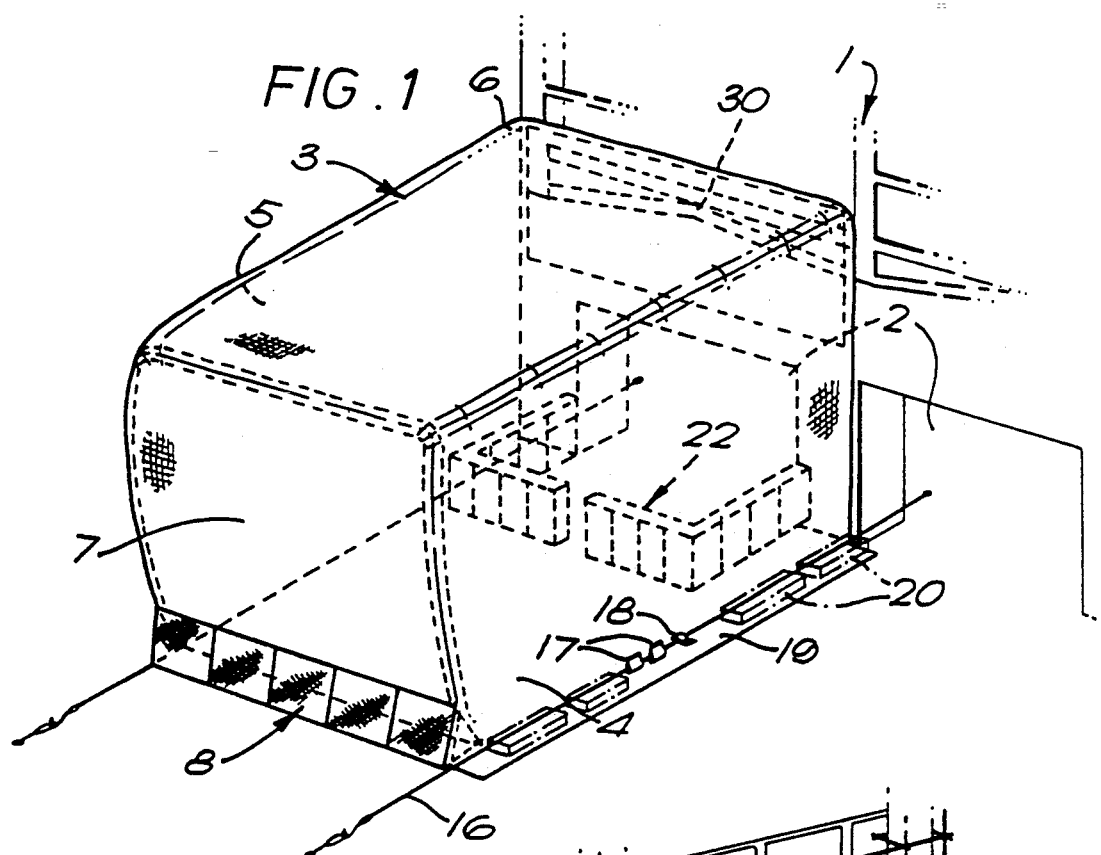
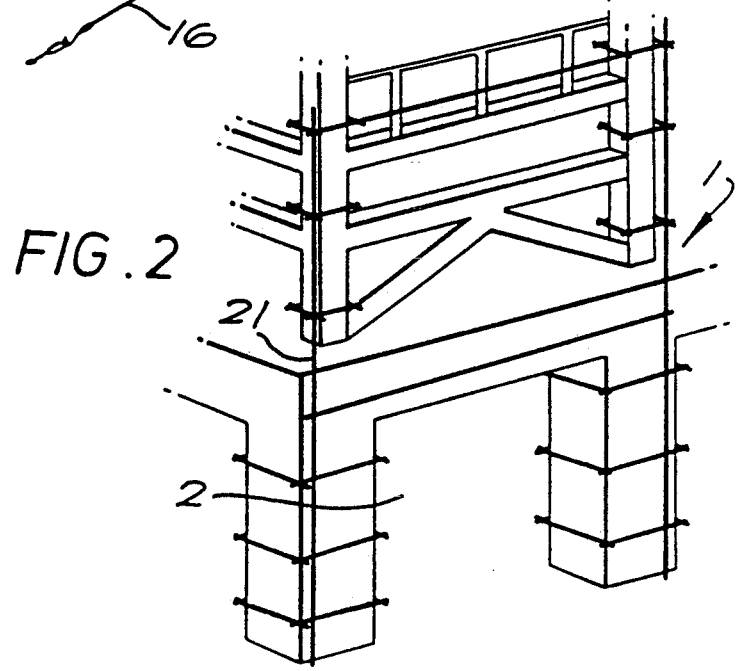

REACTOR VESSEL DISCHARGE

This invention relates to a method and apparatus for containing particulate material, such as for example spent catalysts, when evacuating an industrial reactor vessel used in hydrocarbon processing.

Catalysts are often used in the industrial processing of hydrocarbons in the oil industry. Unfortunately many catalysts are either toxic or at least environmentally undesirable. This presents difficulties when the contents of an industrial reactor vessel for hydrocarbon processing are being emptied, or 'dumped', which is traditionally achieved by the release of steam under pressure prior to for example cleaning the reactor vessel. In the past it has been difficult to contain or restrain the catalyst material, which is normally in the form of a particulate or dust-like material, and the catalyst can escape into the atmosphere adjacent the vessel. With increasing concern for environmental standards this is undesirable from the point of view of both workers in the vicinity of the reactor vessel and the general public.

According to the present invention there is provided apparatus for containing particulate material when discharging an industrial reactor vessel used in hydrocarbon processing, comprising a containment bag having one end for location in use adjacent the wall of a reactor vessel around an outlet thereof, a lower side for engagement with the ground in the vicinity of said outlet, the arrangement being such that, in use, particulate material discharged from the vessel via the outlet is retained within the bag.

By means of this arrangement, at least a major proportion of the potentially harmful particulate material discharged from the reactor vessel may be trapped within the containment bag. Furthermore the dumping procedure may be speeded-up and can be carried out in a matter of hours rather than days.

The bag will usually initially be in a generally deflated condition though with some air trapped therein, and is arranged to be inflated by the gases egressing from the vessel. It is envisaged that the bag may be sufficiently large to retain all of the gases emitted during a catalyst dump, in which case the bag may make a substantial seal with the ground and vessel. Preferably, however, means are provided in the system for permitting the release of harmless gases, normally steam and air, during the discharge whilst particulate material is retained in the bag. In this way the size of the bag may be of more manageable proportions.

In one embodiment such means comprises a filter. The filter may, for example, comprise a plurality of mesh filter panels held within a frame. The filter may conveniently be located adjacent the ground at the rear of the bag remote from the vessel. The filter allows steam and air to escape, whilst retaining any particulate material which may reach the rear of the bag.

Alternatively, one or more air outlet openings may be defined at the end of the bag adjacent the vessel e.g. by the bag being arranged to be spaced away from the vessel wall. It has been found that, during discharge, such a spacing allows the venting from the bag of any air initially trapped therein and also allows for the escape of steam after the bag is fully inflated, whilst the discharged particulate material, owing to its inertia and density, is collected within the bag and not released. Thus, the use of a filter may be avoided. Such spacing may extend completely around the end of the bag i.e. along both side walls and across the top wall.

In all the above examples, there may be some additional slight venting of steam and gas from the bag as a result of imperfect seals between the bag and the ground, for example.

The bag may be substantially sealed to the ground by flap seals extending either inwardly or outwardly of the bag. The flaps preferably extend inwardly so that the sealing effect is enhanced by the pressure within the bag. If the flaps extend outwardly the sealing may be assisted by locating weights on such flaps. The bag may be secured to the ground by means of tensioned wires running through loops formed at the edges of the bag. Clamps may be provided to hold down such wires.

To provide additional containment for discharged particulate material, a barrier wall may be provided within the bag in front of the outlet of the reactor vessel, to stop or at least slow down the initial discharge of material. It has been found that the combination of an internal barrier wall and the bag being spaced away from the vessel wall as discussed above provided a particularly effective containment system with adequate steam and air venting.

The bag may be made of any suitable material such as tarpaulin or a synthetic material, such as for example a vinyl coated nylon material with a urethane coating. Materials that are chemically resistant to the particulate material to be contained are preferred as they will have a longer life.

The bag is preferably such that it assumes a generally rectangular cuboid shape when inflated in use. However, other shapes or configurations may be possible.

According to another aspect of the present invention there is provided a method of containing particulate material during the discharge of an industrial reactor vessel used in hydrocarbon processing, comprising locating a containment bag adjacent the wall of a reactor vessel about an outlet thereof, securing a lower side of said bag to the ground in the vicinity of said outlet, whereby particulate material discharged from the vessel via the outlet is retained within the bag.

Some embodiments of the invention will now be described by way of example and with reference to the accompanying drawings, in which:

FIG. 1 is a perspective view showing a containment bag in use in an inflated condition;

FIG. 2 shows a support structure fixed to a reactor wall for securing a bag thereto;

Figure 4A:
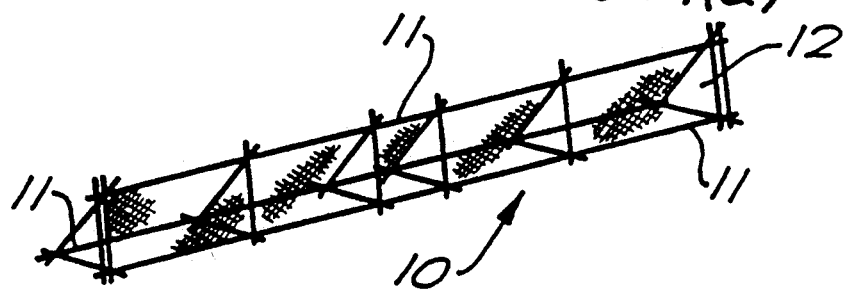
Figure 4B:
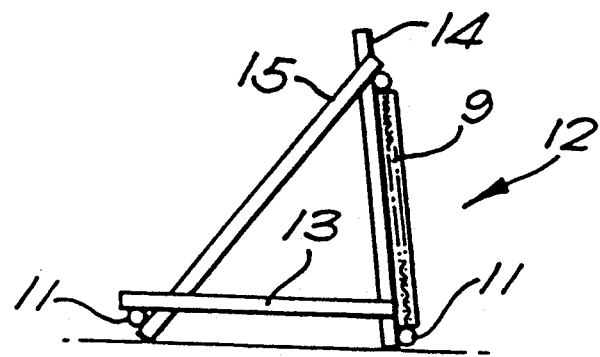
Figure 5:
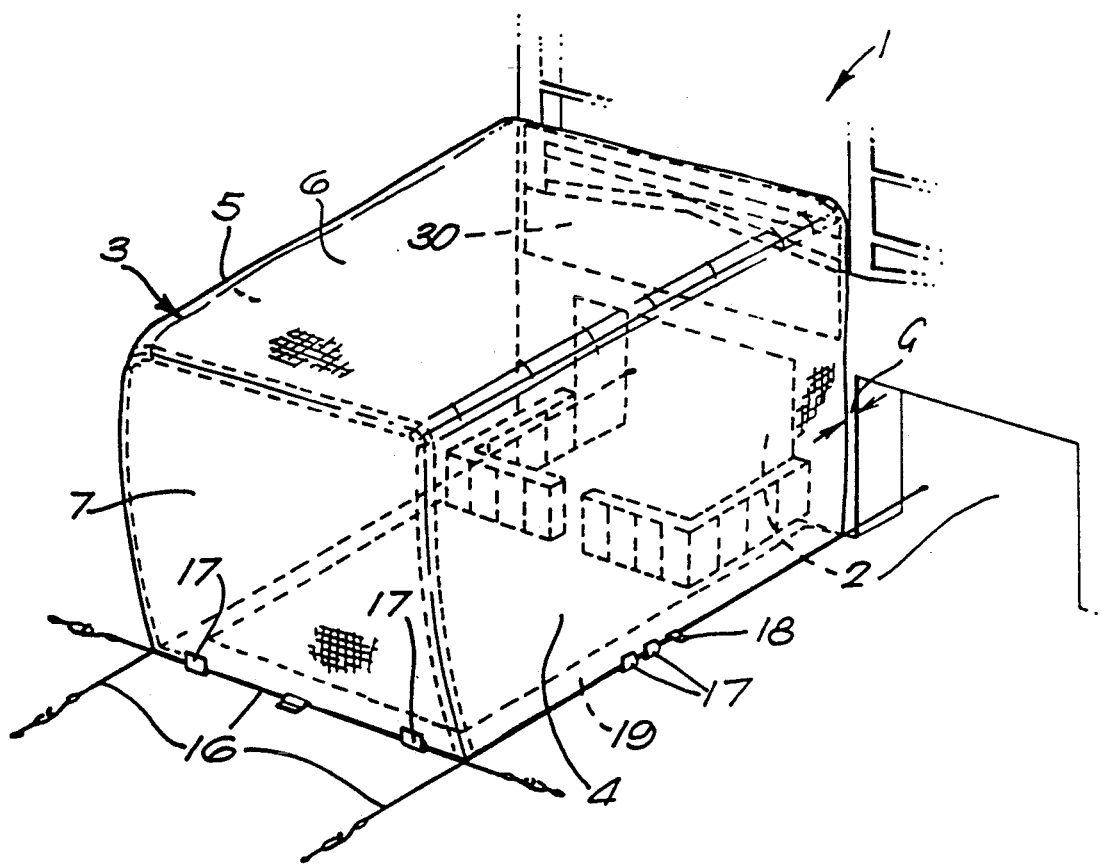

FIGS. 4(a) and (b) show, in perspective and side views respectively, a filter means for escape of gases; and FIG. 5 is a perspective view of a second embodiment.

Referring firstly to FIG. 1 there is shown therein a wall 1 of a reactor housing having a number of outlets 2 for respective reactor vessels. In FIG. 1 a dust containment bag 3 is located at one of the outlets 2. As can be seen from FIG. 1 the bag 3 has a generally cuboid shape. However, it will be understood that the bag only adopts this shape when, in use, it is inflated by means of steam released under pressure from the reactor vessel. However, for convenience, the bag 3 will be described with reference to such a shape.

The bag 3 comprises three rectangular panels laced together along the edges of each panel. In particular the bag comprises a single panel forming the side walls 4,5, and top wall 6 of the bag, a first end panel 7 remote from the vessel outlet 2, and a second end panel 30 adjacent and above the vessel outlet. The remaining sides of the cuboid bag, namely the bottom and the lower part of the other end remote from end panel 7, are open and are fixed in relation to the ground and the wall of the reactor housing 1 respectively. The dimensions of the illustrated bag are 46 feet long, 25 feet high and 20 feet wide, but these may of course vary.

Side walls 4,5 extend to the ground where they are fixed by means to be described below. In the first embodiment, the end panel 7, does not reach the ground but is fixed to the upper edge of a filter means 8. The filter means 8 is shown in detail in FIG. 4(a) and (b) and comprises a series of five mesh filter panels 9 fixed in a frame 10. The frame 10 is constructed from metal rods and has a generally triangular cross-section. The frame consists of three lengthwise rods 11 that interconnect a series of lateral units 12. Each unit 12 comprises a horizontal lower rod 13, a nearly vertical front rod 14, and a sloping rear rod 15; rods 13, 14 and 15 being connected together. The frame can support a number of mesh panels 9 which may be the same size or may be a combination of sizes. The size of the mesh may also be varied to be appropriate for the particular size of material to be contained within the bag.

Figure 3:
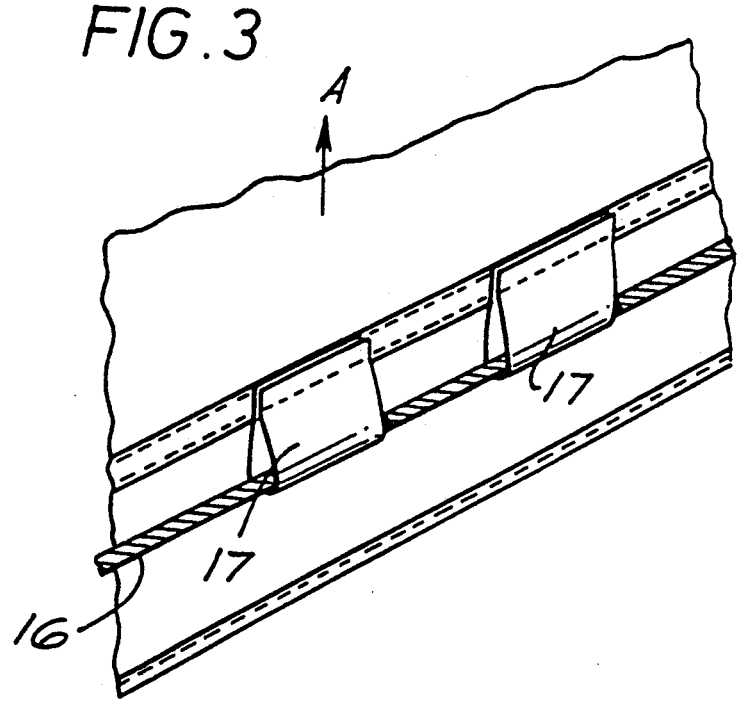
FIG. 3 shows a detail of the bag.

Referring again to FIG. 1 it will be noted that the lower edges of side walls 4,5 are secured to the ground by means of tensioned cables 16 that run through loops 17 formed at the edges of panels 4,5. Arrow A in FIG. 3 shows the upward direction of the force exerted on the bag during use. To counter this lifting force the tensioned cables 16 are held down by clamps 18, only a few of which are shown in FIG. 1.

To provide a degree of sealing side panels 4,5 are provided with flaps 19 that may extend either outwardly or inwardly of the bag. When such flaps extend inwardly, as shown in the FIG. 5 embodiment, the pressure within the bag tends to hold the flaps down in contact with the ground. When the flaps 19 extend outwardly, as in FIG. 1, sleepers 20 may be placed on the flaps to hold them down.

FIG. 2 shows one possible support structure for fixing the bag to the wall of the reactor housing. As can be seen from FIG. 2 a metal scaffold 21 is fixed to the wall 1 of the vessel and the bag is in turn secured to the scaffold e.g. by being lashed thereto by nylon ropes extending through eyelets in the bag.

Also shown in FIG. 1 is a wall 22 that may be constructed in the immediate vicinity of the outlet 2. Such a wall 22 acts as an initial barrier to stop the first flow of particulate material discharged from the reactor vessel.

The embodiment shown in FIG. 5 differs from that in FIG. 1 in that the filter is omitted and the rear end panel 7 is instead secured to the ground by a similar arrangement of cable 16 and flaps 17 to the side walls. In this arrangement the bag is secured to the scaffold in such a way that the end of the bag is spaced away from the vessel wall to define a gap G of about 6 inches between the side walls 4,5 and the vessel wall and between the bag end panel 30 and the vessel wall.

In use the contents of the reactor vessel are then discharged by the release of steam under pressure in a conventional manner. This release of steam causes the bag to inflate and take up the rectangular shape shown in the Figures. The steam is allowed to escape to atmosphere either via the filter 8 or via the gap G, but potentially harmful particulate material, such as spent catalyst, is trapped initially by the bund wall 22, and within the body of the bag. In the FIG. 5 arrangement, whilst steam and air is vented via the gap G, particulate material as a result of its outward momentum during egress from the vessel via the outlet is contained within the bag. After this discharge is completed, the bag may be removed and once the catalyst has cooled it may be transferred to drums for subsequent safe disposal. The bag may be reused, at least for a limited number of operations, and if made of a suitable material, preferably synthetic, is advantageously washed before the next discharge.

We claim:

1. In an apparatus for retaining particulate matter discharged from an industrial reactor through a discharge outlet, wherein the improvement comprises:
   a containment bag, said bag having one end suitable for placement adjacent to said discharge outlet;
   said bag having a lower side which provides a means for engaging the ground;
   a barrier wall located within said bag and arranged in front of said reactor vessel outlet;
   said bag and barrier wall thereby retaining particulate matter discharged from said reactor via said outlet.

2. The apparatus of claim 1, wherein said bag is provided with a means for venting gas during the discharge of particulate matter from said reactor while retaining particulate matter within the bag.

3. Apparatus according to claim 2 wherein said means comprises a filter.

4. Apparatus according to claim 3 wherein said filter is located adjacent the ground at the end of said bag remote from the vessel outlet.

5. Apparatus according to claim 2 wherein a vent opening is defined as a spacing between said bag and the reactor vessel outlet.

6. Apparatus according to claim 5 wherein the bag is spaced away from a wall of the reactor vessel to define said vent opening.

7. Apparatus according to claim 1 wherein said bag is substantially sealed to the ground by flap seals.

8. Apparatus according to claim 7 wherein said flap seals extend inwardly of the bag and the sealing effect is thereby enhanced by means of the pressure within the bag in use.

9. Apparatus according to claim 7 wherein said flap seals extend outwardly of the bag and the sealing is effected by means of weights placed on said flaps.

10. Apparatus according to claim 1 wherein said bag is secured to the ground by means of tensioned cables running through loops formed at the edges of the bag.

11. Apparatus according to claim 10 wherein clamps are provided to hold down said wires.

12. Apparatus according to claim 1 wherein said end of the bag for location adjacent the reactor housing wall is secured to a scaffold structure fixed to said wall.

13. Apparatus according to claim 1 wherein said bag comprises a first panel defining atop and two side walls, and an end panel located in use remote from the reactor vessel outlet, such that said bag assumes a generally rectangular cuboid shape when inflated in use.

14. Apparatus according to claim 1 wherein said bag is made of a tarpaulin material.

15. Apparatus according to claim 1 wherein said bag is made of a vinyl coated nylon material.

16. A method of containing particulate material during the discharge of an industrial reactor vessel used in hydrocarbon processing, comprising:

providing a reactor vessel having a wall with an outlet;

locating a containment bag adjacent the wall of said reactor vessel about said outlet in said reactor wall and locating a barrier wall over the outlet of the reactor vessel;

securing a lower side of said bag to the ground in the vicinity of said outlet;

discharging particulate matter from the vessel via the outlet whereby said particulate matter is retained by the bag.

17. A method according to claim 16 further comprising allowing venting of gases from the bag during particulate discharge whilst retaining particulate material therein.

18. A method according to claim 17 wherein said venting is allowed by spacing the bag away from the reactor vessel wall in the region adjacent the reactor vessel outlet.

19. In an apparatus for containing particulate material when discharging an industrial reactor vessel used in hydrocarbon processing, wherein the improvement comprises: a containment bag having one end located adjacent a wall of said reactor vessel around an outlet thereof, a lower side for engagement with the ground in the vicinity of said outlet, the arrangement being such that, in use, particulate material discharged from the vessel via the outlet is retained within the bag, further comprising a filter located adjacent the ground at the end of said bag remote from the vessel outlet for permitting venting of gas from the bag during discharge and a barrier wall located within said bag and arranged in front of said reactor vessel outlet.

20. In an apparatus for containing particulate material when discharging an industrial reactor vessel used in hydrocarbon processing, wherein the improvement comprises: a containment bag having one end located adjacent a wall of said reactor vessel around an outlet thereof, a lower side for engagement with the ground in the vicinity of said outlet, the arrangement being such that, in use, particulate material discharged from the vessel via the outlet is retained within the bag, further comprising a vent opening defined as a spacing between said bag and the reactor vessel outlet thereby permitting venting of gas from the bag during discharge and a barrier wall located within said bag and arranged in front of said reactor vessel outlet.

* * * * *